*J. R. Hand,*

*Cultivator.*

No. 88,868. Patented Apr. 13, 1869.

Attest.
Jas. H. Layman
W. B. Denning

Inventor.
John R. Hand
by Knight Bros.
Attys.

United States Patent Office.

JOHN R. HAND, OF BILLINGSVILLE, INDIANA.

Letters Patent No. 88,868, dated April 13, 1869.

---

IMPROVEMENT IN CULTIVATORS.

---

The Schedule referred to in these Letters Patent and making part of the same.

---

*To whom it may concern:*

Be it known that I, JOHN R. HAND, of Billingsville, Union county, Indiana, have invented certain new and useful Improvements in Cultivators; and I hereby declare the following to be a full, clear, and exact description thereof, reference being had to the accompanying drawings, making part of this specification.

This invention relates to that class of agricultural implements commonly known as cultivators; and The first part of my improvement consists in providing the machine with a swinging seat, which, in its elevated position, permits of the operator walking upon the ground, and, in its depressed position, enables him to ride upon the machine, said seat also being rendered shiftable, for the purpose of allowing the driver's weight to counterbalance the working parts of the implement, so as to regulate the weight upon the horses.

The second part of my improvements relates to an arrangement of devices for elevating the shares above the ground, so as to render them non-effective whenever it is desired to transfer the implement from one field to another.

The third part of my improvement consists in the means of adjusting the shares, so as to permit of their operating around corn which has been planted in either wide or narrow rows.

In the accompanying drawings—

The ground-wheels, A A', support a frame, which is composed of the axle, B, side-beams, C C', and cross-beams, D and E, the latter of which has, depending from it, two hangers, F F', that are adjusted longitudinally of said beam E, by means of slots, *e e'*, screw-threaded rods, G G', and nuts, *g g'*.

Attached to the hangers, by means of bolts, *f f'*, are plates, H H', having slots, *h h'*, and the lower ends of said plates terminate in links, I I'.

The provision of the bolts *f f'* and slots *h h'* permits of a vertical adjustment of the plates F F'.

Extending from the hangers F F' to the axle B, are two inclined braces, J J', which are rigidly attached to said hangers, but are free to move along the axle whenever the hangers are adjusted in either direction.

The screw-threaded rods G G' serve to unite the cross-beam E, hangers F F', and inclined braces J J', so as to form a stout frame-work for the attachment of the plow-beams, K K', whose clevises, *k k'*, are engaged with the links I I', on the lower ends of the slotted and adjustable plates H H', *h h'*.

The rear ends of the beams K K' have, secured to them, standards, L L', to which is secured any approved form of shovels, or shares, *l l'*.

Tie-rods, M, extend from the standards to the beams K K'.

The beams K K' are provided with customary handles, N N', that are united together by perforated bars, O O', *o o'*, and set-screws, P P'.

Figure 3:
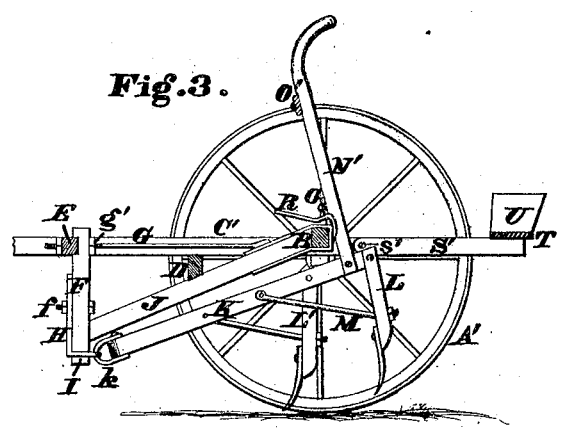
Figure 3 is another longitudinal section, with the shares in their elevated, or non-effective position, and the seat lowered, so as to permit the operator riding upon the machine.

Attached to the axle B is a spring, R, over which the lower perforated bar O engages, when the shovels are elevated to their non-effective position, shown in fig. 3.

The rear portions of the side-beams C C' are slotted at *c c'*, for the reception of the adjustable bolts *s s'*, which serve as pivots for the arms S S', to whose free ends is attached a board, T, that supports the driver's seat, U.

The pole V, of the implement, is secured to the cross-beams D and E.

Figure 1:
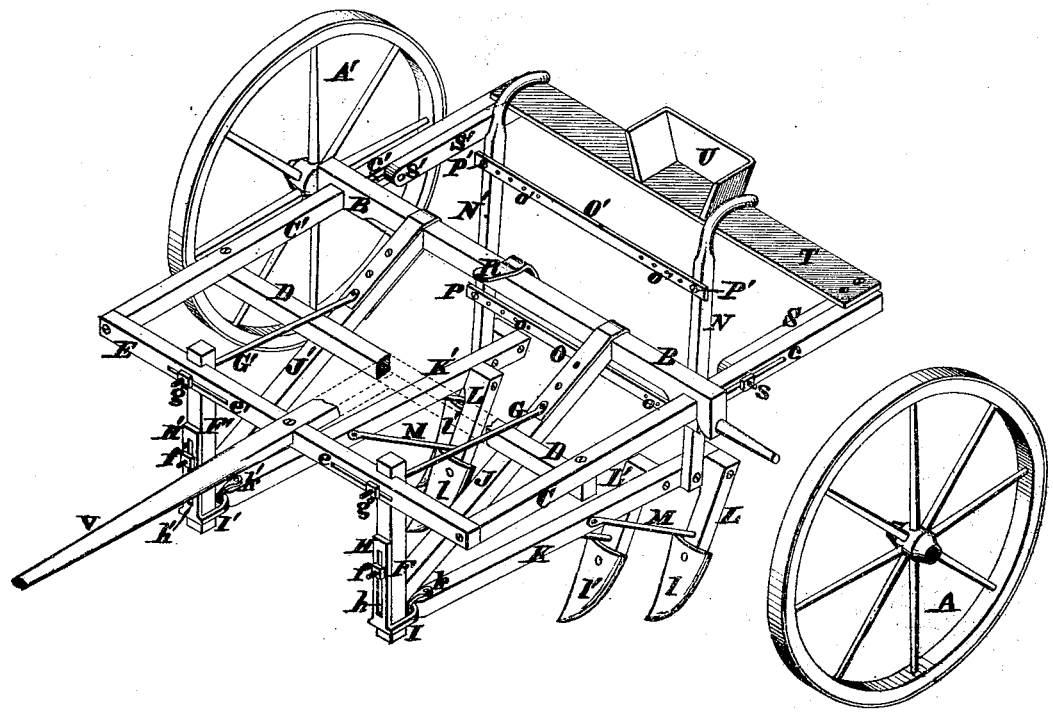
Figure 1 is a perspective view of my improved cultivator, with one of the ground-wheels detached from the machine.
Figure 2:
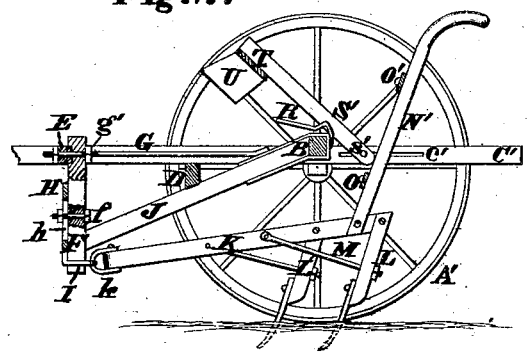
Figure 2 is a longitudinal section of the implement, with the driver's seat elevated, so as to permit of the operator walking upon the ground, in the rear of the machine.

When the operator desires to ride upon the machine, the arms S S' are depressed, so that the ends of the board T may rest upon the side-beams C C', as shown in fig. 1, and as soon as the rider is mounted upon the seat U, he has complete control of the handles N N' of the plows; but in case he prefers walking in the rear of the implement, the seat U is elevated, so as to be out of his way, by swinging said arms S S' over until they rest upon the axle B, as shown in fig. 2.

Whenever it is desired to run the implement along a road, or to transfer it from one field to another, without allowing the shares to come in contact with the ground, they are rendered non-effective by simply elevating the beams K K', and maintaining them in such position, by engaging the bar O over the spring R, as shown in fig. 3, and in this condition of the machine the driver can mount the seat U, and control the team.

I claim herein as new, and my invention—

1. The provision, in a cultivator, of the slotted side-beams C C', *c c'*, adjustable pivots *s s'*, swinging arms S S', support T, and seat U, for the object explained.

2. The combination, as herein described, of the cross-beam E, hangers F F', coupling-devices I I', *k k'*, beams K K', standards L L', handles N N', bar O, and spring R, for permitting of the elevation of the shares *l l'*, for the purpose set forth.

3. The general combination and arrangement of the slotted cross-beam E *e e'*, hangers F F', *f f'*, screw-threaded tie-rods G G', *g g'*, slotted plates H H', *h h'*, I I', shiftable braces J J', beams K K', *k k'*, standards L L', shares *l l'*, rods M, handles N N', perforated bars O O', *o o'*, and set-screws P P', for the purpose of producing an improved adjustable cultivator.

In testimony of which invention, I hereunto set my hand.

JOHN R. HAND.

Witnesses:
GEO. H. KNIGHT,
JAMES H. LAYMAN.